US009183604B2

(12) United States Patent
Lauper et al.

(10) Patent No.: US 9,183,604 B2
(45) Date of Patent: Nov. 10, 2015

(54) IMAGE ANNOTATION METHOD AND SYSTEM

(71) Applicant: Vidinoti SA, Fribourg (CH)

(72) Inventors: Eric Lauper, Bern (CH); Rudolf Ritter, Zollikofen (CH); Laurent Rime, Fribourg (CH)

(73) Assignee: Vidinoti SA (CH)

( * ) Notice: Subject to any disclaimer, the term of this patent is extended or adjusted under 35 U.S.C. 154(b) by 252 days.

(21) Appl. No.: 13/671,285

(22) Filed: Nov. 7, 2012

(65) Prior Publication Data

US 2013/0129252 A1     May 23, 2013

(30) Foreign Application Priority Data

Nov. 8, 2011    (CH) ....................................... 1791/11

(51) Int. Cl.
    *G06F 17/30*      (2006.01)
    *G06T 1/00*      (2006.01)

(52) U.S. Cl.
    CPC ............ *G06T 1/00* (2013.01); *G06F 17/30041* (2013.01); *G06F 17/30044* (2013.01); *G06F 17/30047* (2013.01)

(58) Field of Classification Search
    USPC ......................................................... 382/276
    See application file for complete search history.

(56) References Cited

U.S. PATENT DOCUMENTS

| | | | |
|---|---|---|---|
| 7,525,578 B1 * | 4/2009 | Barbeau ...................... 348/231.3 |
| 7,555,649 B1 * | 6/2009 | Schwenk et al. ............... 713/176 |
| 7,765,184 B2 * | 7/2010 | Makela .......................... 707/603 |
| 8,036,467 B2 * | 10/2011 | Matraszek et al. ............. 382/224 |
| 8,245,124 B1 * | 8/2012 | Gupta ............................ 715/202 |
| 8,489,600 B2 * | 7/2013 | Hannuksela ................... 707/736 |
| 8,831,380 B2 * | 9/2014 | Ofek et al. ..................... 382/284 |
| 2002/0059342 A1 * | 5/2002 | Gupta et al. ................... 707/512 |
| 2002/0154144 A1 * | 10/2002 | Lofgren et al. ................ 345/634 |

(Continued)

FOREIGN PATENT DOCUMENTS

| | | | |
|---|---|---|---|
| EP | 1246080 A2 | 10/2002 |
| WO | WO-2008032203 A3 | 7/2008 |

OTHER PUBLICATIONS https://www.lexisnexis.com/applieddiscovery/lawlibrary/whitePapers/ADI_FS_ChainOfCustody.pdf wayback date Nov. 19, 2008.*

(Continued)

*Primary Examiner* — Michelle Entezari
(74) *Attorney, Agent, or Firm* — Blank Rome LLP (57) ABSTRACT

An originating user captures an original image with mobile equipment. The image is displayed on the originating user's mobile equipment with first annotations. First data information (R1) including the time and the location of the mobile equipment together with information that the first annotations has been displayed is sent to a server. The originating user transmits the image to a second equipment of at least one second user. The image is displayed on the second equipment. Second annotations are displayed to said second user in combination with said image. Second data information (R2) including the time and the location of equipment of the second user together with information that the second annotations has been displayed is sent to the server. The server determines from the location and/or time whether said image is an original image captured by the originating user, or a transmitted image displayed to a second user.

28 Claims, 7 Drawing Sheets

(56) References Cited

U.S. PATENT DOCUMENTS

| | | | |
|---|---|---|---|
| 2003/0020962 A1* | 1/2003 | Tanimoto | 358/402 |
| 2003/0023682 A1* | 1/2003 | Brown et al. | 709/204 |
| 2003/0028782 A1* | 2/2003 | Grundfest | 713/182 |
| 2003/0065642 A1* | 4/2003 | Zee | 707/1 |
| 2004/0001606 A1* | 1/2004 | Levy | 382/100 |
| 2004/0071311 A1* | 4/2004 | Choi et al. | 382/100 |
| 2005/0086484 A1* | 4/2005 | Muratani | 713/176 |
| 2005/0246374 A1* | 11/2005 | Blinn et al. | 707/104.1 |
| 2008/0130058 A1* | 6/2008 | Cheng | 358/3.28 |
| 2008/0140448 A1* | 6/2008 | Hernandez et al. | 705/2 |
| 2009/0157593 A1* | 6/2009 | Hayashi et al. | 707/1 |
| 2009/0210801 A1* | 8/2009 | Bakir et al. | 715/753 |
| 2010/0169980 A1* | 7/2010 | Kim et al. | 726/27 |
| 2010/0271490 A1* | 10/2010 | Jung et al. | 348/207.1 |
| 2011/0047039 A1* | 2/2011 | Crames et al. | 705/18 |
| 2011/0072085 A1* | 3/2011 | Standley | 709/204 |
| 2011/0201356 A1* | 8/2011 | George | 455/456.2 |
| 2011/0282965 A1* | 11/2011 | Dodson | 709/217 |
| 2012/0033247 A1* | 2/2012 | Bernardo | 358/1.14 |
| 2012/0036140 A1* | 2/2012 | Nielsen et al. | 707/754 |
| 2012/0047103 A1* | 2/2012 | Marecki et al. | 706/52 |
| 2012/0155547 A1* | 6/2012 | Littwitz et al. | 375/240.18 |
| 2012/0159001 A1* | 6/2012 | Liu et al. | 709/248 |
| 2012/0237090 A1* | 9/2012 | Ikenoue et al. | 382/118 |
| 2012/0301103 A1* | 11/2012 | Cazier et al. | 386/239 |
| 2013/0030306 A1* | 1/2013 | Yamanaka et al. | 600/477 |
| 2013/0091562 A1* | 4/2013 | Matsuzawa et al. | 726/17 |
| 2013/0297739 A1* | 11/2013 | Faihe et al. | 709/217 |

OTHER PUBLICATIONS

H. Tarumi et al., "Communication through Virtual Active Objects Overlaid onto the Real Word," Proceedings of the 3rd Int'l Conference on Collaborative Virtual Environments, Sep. 10-12, 2000. pp. 155-164.

* cited by examiner

Fig.4

| Model ID | Sender ID | Recipient ID | Channel | Date | Time | ... |
|---|---|---|---|---|---|---|
| 1 | A | B | Twitter | 19.05.12 | 03h56 | ... |
| 1 | A | C | Facebook | 20.05.12 | 19h21 | ... |
| 1 | B | D | Email | 21.05.12 | 23h03 | ... |
| 1 | B | E | Sms | 23.05.12 | 9h17 | ... |
| 1 | B | A | Email | 25.05.12 | 15h10 | ... |
| 1 | D | E | Sms | 25.05.12 | 16h18 | ... |
| 2 | C | E | Sms | 26.05.12 | 01h45 | ... |
| 1 | D | C | Twitter | 26.05.12 | 9h20 | ... |
| 2 | C | F | Facebook | 28.05.12 | 22h49 | ... |
| 2 | E | B | Email | 29.05.12 | 13h37 | ... |

| Model ID | Sender ID | Recipient ID | Channel | Date | Time | xxx |
|---|---|---|---|---|---|---|
| 1 | A | B | Twitter | 19.05.12 | 03h56 | ... |
| 1 | A | C | Facebook | 20.05.12 | 19h21 | ... |
| 1 | B | D | Email | 21.05.12 | 23h03 | ... |
| 1 | B | E | Sms | 23.05.12 | 9h17 | ... |
| 1 | B | A | Email | 25.05.12 | 15h10 | ... |

Fig.7

| Model ID | Sender ID | Recipient ID | Channel | Date | Time | xxx |
|---|---|---|---|---|---|---|
| 1 | A | B | Twitter | 19.05.12 | 03h56 | ... |
| 1 | A | C | Facebook | 20.05.12 | 19h21 | ... |
| 1 | B | D | Email | 21.05.12 | 23h03 | ... |
| 1 | B | E | Sms | 23.05.12 | 9h17 | ... |
| 1 | B | A | Email | 25.05.12 | 15h10 | ... |
| 1 | D | E | Sms | 25.05.12 | 16h18 | ... |
| 2 | C | E | Sms | 26.05.12 | 01h45 | ... |
| 2 | E | B | Email | 29.05.12 | 13h37 | ... |

| Model ID | Sender ID | Recipient ID | Channel | Date | Time | ... |
|---|---|---|---|---|---|---|
| 1 | A | B | Twitter | 19.05.12 | 03h56 | ... |
| 1 | A | C | Facebook | 20.05.12 | 19h21 | ... |
| 1 | B | D | Email | 21.05.12 | 23h03 | ... |
| 1 | B | E | Sms | 23.05.12 | 9h17 | ... |
| 1 | D | E | Sms | 25.05.12 | 16h18 | ... |
| 2 | C | E | Sms | 26.05.12 | 01h45 | ... |
| 1 | D | C | Twitter | 26.05.12 | 9h20 | ... |
| 2 | C | F | Facebook | 28.05.12 | 22h49 | ... |

Fig.8

| Parent model ID | Child model ID | Date | Time | ... |
|---|---|---|---|---|
| 1 | 2 | 25.05.12 | 03h06 | ... |

Fig.9

IMAGE ANNOTATION METHOD AND SYSTEM

BACKGROUND OF THE INVENTION

1. Related Applications

This application claims priority to CH01791/11, filed Nov. 8, 2011, the content of which is incorporated herein by reference.

2. Field of the Invention

The present invention relates to a method used in relation with display of reality augmented information on image.

3. Background of the Related Art

WO2008032203 concerns a method where a user with a mobile equipment captures an image, for example the image of a point of interest. Features of the image are compared with source image to attempt recognition; the image is then tagged. Those tags are displayed to the user who can click or select a tag to get more information related to the keyword. The application further suggests sending the tags to a "visual search server". This document is thus related to automatic classification of images, but not to augmented reality where annotations are superimposed over recognized features of an image.

Tarumi H et al., in "Communication through virtual active objects overlaid onto the real world", Proceedings of the 3rd international conference on collaborative virtual environments, CVE2000, San Francisco, Sep. 10-12, 2000, describe a system for creating and displaying virtual objects, called SpaceTags, that can be accessed only within a limited area and a limited time period. SpaceTags can be created by end-users and transmitted to the server. They can be associated with real-world objects and displayed as augmented reality annotations.

EP1246080 discloses a method of displaying augmented reality augmented information on static or video images. In one embodiment, names of mountains or other cartographic features are superimposed on a landscape view. In another embodiment, visitors in a painting exhibition can have additional information related to a selected painting displayed over a view of this painting captured with a mobile device. The augmented reality features of a view can comprise additional annotations, highlights, etc.

Augmented reality is also proposed by various companies for annotating advertisings, such as billboards or newspaper ads, and providing customers with additional contents related to this ad.

SUMMARY OF THE INVENTION

It is an aim of the present invention to provide a new method based on augmented reality.

The invention is based on the finding that more and more images are associated with an augmented reality content, i.e., annotations. It is likely that some of those images will be transmitted over various electronic channels, for example over emails, MMS, blogs, social networks and so on, to other recipients. For example, some users might want to transmit an image of a mountain, painting or advertising to other users.

If augmented reality becomes more ubiquitous, it is likely that at least some of those recipients will check if those images they receive are associated with augmented reality annotations. For example, some users will capture an image received in an email or otherwise, and associate this image with augmented reality content. The sender might even invite the recipient to do so when the augmented reality content is of particular interest.

In addition, more and more users will create augmented reality models for matching with subsequently captured images. Some of those augmented reality models will be private, others will be public and available to everyone and many will be shared or transmitted, for example over social networks, for allowing friends or related users to access additional content when they capture an image matching this model.

It has been found that for providers of augmented reality content it could be important to know whether the annotated view is an original view captured by the originating user, or a transmitted image of this view received by a recipient. It might also be important to know how and to whom an augmented reality model is shared.

A value-added content provider might have different reasons to need this information. For example, some providers might want to provide different annotations to the first originating user than to later viewers, who might even be prevented from accessing those annotations. If the annotated image corresponds to an advertising, the advertising company might charge a different fee for the first view than for subsequent ones, and/or want to prepare reports for showing the viral distribution of the image. In some situations, one might want to inform a user who captured and distributed an image that this image has been displayed and annotated by some recipients.

In the prior art, there is no easy and robust way for knowing whether the annotated view is an original view captured by the originating user, or a transmitted image of this view received by a recipient. In addition, there is no easy way for knowing whether an augmented reality model has been shared.

Therefore, according to one aspect of the invention, this information is made available with a method comprising:

(a) an originating user captures an original image with a mobile equipment;

(c) first data information including the time and the location of said mobile equipment is stored;

(d) the originating user shares said image with a second equipment of a second user, either as an image to annotate or as a model for annotating other images;

(e) an annotated image is displayed on said second equipment;

(g) second data information including the time and the location of said second equipment is stored.

Those various steps might be carried out in the alphabetical order of the above lettered list. Alternatively, those various steps might be carried out in a different, non-alphabetical order. Similar and identical steps are designated with the same letters throughout the document, where they are described with various levels of details.

The first and second data information might be stored centrally in a server, for example in a central database accessed by the equipments of all users. Alternatively, in a distributed system, the first and second data information might be stored in the user's equipments.

In one embodiment, users share images to annotate, using an otherwise available augmented reality model. The first and the second data information include time and location of the corresponding user's equipment when those transmitted images are displayed. Alternatively, the first and second data information include time and location of the corresponding user's equipment when those images are transmitted.

The method of this embodiment may also include:

(b) the original image is displayed on the originating user's mobile equipment with first annotations superimposed on the image and in relation with recognized features of the image;

(c) said first data information further includes an information that said first annotations has been displayed on the originating user's mobile equipment, (d) the originating user shares said image as an image to annotate by transmitting said image to said second equipment;

(e) the image is displayed on said second equipment;

(f) second annotations are displayed to said second user in combination with said image;

(g) said second data information further include an information that said second annotations has been displayed to said second user, said second information being further sent to the server;

(h) said server determines from the received location and/or time whether said image is an original image captured by the originating user, or a transmitted image displayed to a second user.

Time and location might not be sufficient to determine in all situations whether an image is an original or a transmitted image. Nevertheless, in many applications such as statistical analysis of campaigns, etc, a perfect accuracy is not required, and even a not always reliable determination might be extremely useful. Other parameters, including for example embedded watermarks, could be used in addition to time and location when a higher reliability is needed.

In a further embodiment, users share augmented reality models that are later used by the recipients for annotating other images. The first and the second data information include time and location of user's equipments at the instant when the augmented reality models are shared. Accordingly, the method of this embodiment may include:

(b) said first data information include said time and location of said first mobile equipment when said image used as a model is shared by the originating user;

(f) second annotations are displayed to said second user, based on said model and superimposed on a further image;

(f') the second user shares said model with a third user;

(g) said second data information include said time and location of said second mobile equipment when said image used as a model is shared by the second user.

The present invention thus provides a method and system to keep track of shared images or shared augmented reality model, notably in an augmented reality social network. It then becomes possible to determine information about the distribution of a given shared augmented reality content as well as its modification.

In the present application, the expression "augmented reality model", or sometimes simply "model", designates a set of data required to recognize an image and play back the augmented reality content. An augmented reality model may comprise a 2D or 3D or plenoptic model of a scene, or a list of features identifying a scene and which can be matched with corresponding features in a captured image, as well as one or a plurality of annotations associated with one or several elements in this model.

According to an aspect of the present invention, there is provided a method for determining if an annotated view is an original view captured by an originating user, or a transmitted image of said view, received by a recipient, the method comprising the steps of:

(a) capturing an image of an element with a first mobile equipment;

(b) displaying the image on the first mobile equipment;

(c) annotating the image displayed on the first mobile equipment with first annotations, wherein the first annotations are displayed on the image;

(d) sending first data information to a server, wherein the first data information includes the current time and the location of said first mobile equipment together with an information that said image displayed on the first mobile equipment has been annotated with the first annotations;

(e) transmitting said image, from the first mobile equipment, to at least one other equipment;

(f) receiving the image at least in one other equipment and displaying said image at least in one other equipment;

(g) annotating the image displayed at least in one other equipment with second annotations, wherein the second annotations are added to the image;

(h) sending second data information to a server, wherein the second data information includes the current time and the location of at least one other equipment, together with an information that the image displayed on said at least in one other equipment has been annotated with said second annotations;

(i) operating the server to determine from said current time and/or location of a respective equipment whether said image displayed on the respective equipment is an original image captured by said respective equipment or is an image transmitted to said respective equipment from another equipment.

According to an aspect of the present invention, a method is provided for retrieving from a database a time period and/or a location associated with an augmented reality model, such as a reference image, and using this time period and/or location for determining whether an image matching said augmented reality model is an original image or a copy. The annotation of the image might depend on the result of this test.

According to one aspect, the possible location and/or time where an image can possibly be taken is known, for example in a server. In one example, the server could know a geographic area and time periods from which a day view of the north face of the Matterhorn can be taken. In the case of advertising billboards, the server could access a database to retrieve the location and/or planning of distribution of each image. In those situations, each originating image can be associated with a location, such as a punctual position or geographic area, from where the image can be captured. Each originating image could also be associated with a time, or series of time periods, during which the image can be taken. An image associated with a different location and/or time period is considered to be a copy of an originating initial view.

BRIEF DESCRIPTION OF THE FIGURES

The invention will be better understood with a description of some possible embodiments illustrated with the following features.

DETAILED DESCRIPTION OF THE PREFERRED EMBODIMENTS

In this document, a "mobile device" or "mobile equipment" means a personal, portable device like a mobile phone, a mobile station, a PDA, a tablet, a smartphone equipped with or connected to a camera capable of communication over a network.

Figure 1:
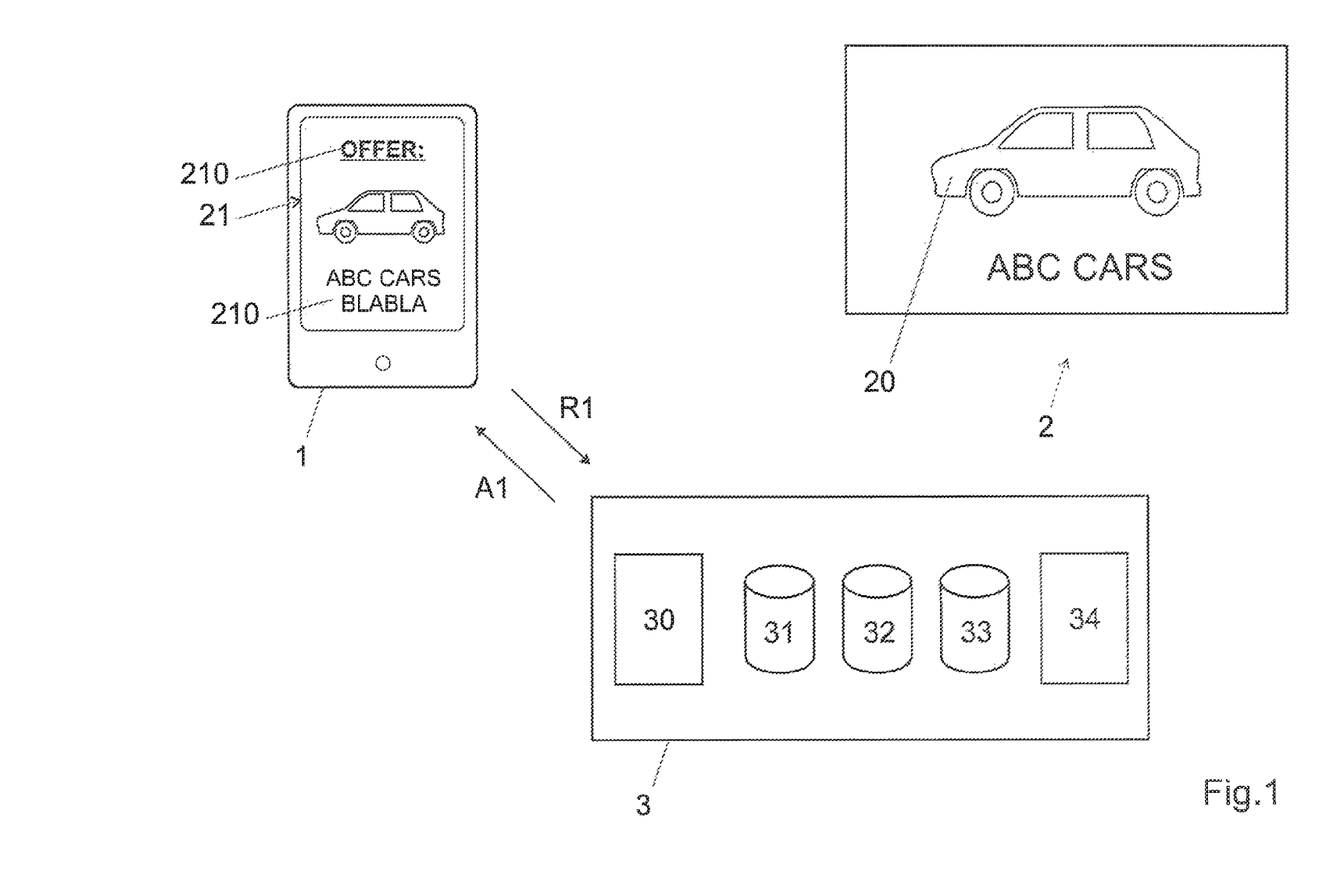
FIG. 1 schematically illustrates an access to augmented reality content by the originating user.

FIG. 1 illustrates an access to augmented reality content by a first user. An originating user uses a mobile device to capture an initial image of a scene comprising at least one element 2 with one or more features to annotate. In this example, the element is an advertising poster 2, for example a paper advertising poster, or an electronic advertising poster, or a billboard or digital signages for displaying static or animated adverting images. A digital signage includes a display and a local controller, the last having access to a server over a communications network or to a local data storage (such as a hard disk, a USB stick etc) for displaying visual content. The poster 2 may comprise one or more features 20 which can be annotated independently from each other, for example one or several elements of the image, one barcode or data matrix, one logo, and so on. The user initiates a display of annotations (augmented reality content) on his mobile equipment 1, using for example a suitable software application executed in user's mobile equipment. In one embodiment, the application could be the PixLive application available on the iOS operating system. In one embodiment, the software application includes an imaging tool which enables a user to capture an image; in this case the image is captured directly using the tool in the application. The image could be a still picture or an animated figure.

In one embodiment, the application in the mobile equipment 1 sends a request R1 for annotation (additional content) to a remote server 3. The remote server 3 could be a single server connected to the Internet, a park of different interconnected machines, a virtual server in a cloud system, for example. The request R1 could be sent over the Internet. The request R1 preferably contains the static or video image to annotate, or at least some features allowing the remote server to identify a matching augmented reality model and determines a set of possible annotations.

In one embodiment, some parts of the remote server 3 can be located and operated directly on the mobile equipment 1. Especially the annotating module 30 and the model database 32 can be implemented on a smartphone in order to speed up the process of recognizing a reference image and augmenting its content.

In one embodiment, the remote server 3 comprises an augmented reality module using computer vision methods to analyse the content of the received image, to match it with a model such as a reference image 32 previously stored or otherwise made available to the server 3. The server further registers the captured image with the matching model, and uses an annotating module 30 to prepare an annotated image 21 to be send over message A1 and displayed by the mobile equipment, in which additional content, i.e., annotations (augmented reality elements), 210 from a database 31 is added on or is in relation with the recognized features of the image. The annotations 210 could comprise text, images, highlights, hyperlinks, audio, video, etc. The superimposed annotations could comprise text, images, highlights, hyperlinks, video, etc., displayed on top of a captured or received image.

In another embodiment, the matching of features of the captured image with reference features of the model, the registration, and/or the combination of the retrieved annotation with the image, is carried out at least in part by an augmented reality module in the user's mobile equipment 1 The augmented reality models may be stored in a distributed way in the user's equipments, and shared between users for instance by transmitting the models directly from one equipment to the next, or by downloading the models from a central storage in the server 3. In this case, the request R1 for annotation will be executed locally in the user's equipment.

The request R1 sent by the mobile equipment 1, or any subsequent request for annotation, includes the location of the mobile equipment 1 as determined by the mobile equipment itself, using for example a satellite geopositioning system such as a GPS module, and/or network location information previously transmitted by a cellular network, and/or the relative position of one or more beacons. This request R1 also, or alternatively, comprises the time at which the image has been captured and/or the time at which the model or the image to annotate has been sent or received by the user's mobile equipment. In one embodiment, time is not transmitted, and the server or software module in the user's equipment assumes that the request R1 was transmitted in real time after the capture of the image; in this case, the transmission of time is implicit.

The annotation on the image 21 can depend on said time and/or location. For example, the language of the annotations 210 could depend on the main language of the region where the recipient is currently located. Optionally, the mobile equipment 1 or remote server 3 may provide a means which enables a user to select in which language the annotations 210 should be displayed.

The server 3 preferably also contains a user right storing database 33 for determining which user or group of users can access to a particular annotation associated with a feature of an augmented reality model. Some content may depend on a previous subscription, or on a token, as will be described. Therefore, availability of annotations (annotating content) 31 depends on user rights in database 33.

Figure 2:
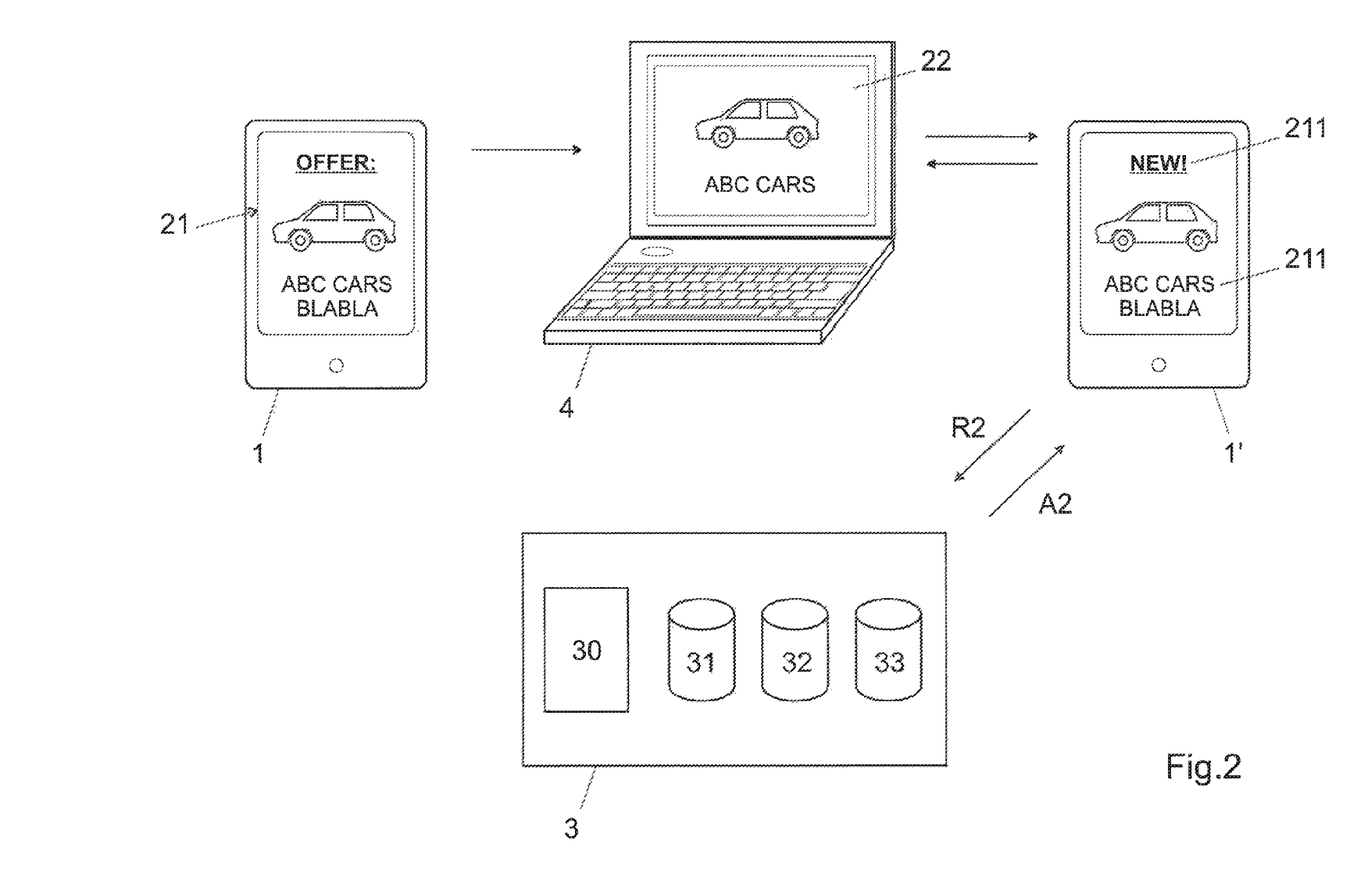
FIG. 2 schematically shows a second access to augmented reality content by a second user to which the initial image has been transmitted.

On FIG. 2, the user of the mobile equipment 1 uses a software module for sharing with a second equipment the original image, or for sharing with this second equipment an augmented reality model corresponding to the original image. Using this module, the user of the mobile equipment distributes the initially captured image, or an augmented reality reference model to match with subsequent images, to a second equipment 4. In this particular example the second equipment is a laptop 4; however it will be understood that the second equipment may take any suitable form, for example it could be a PC or another mobile device such as a mobile phone or a smartphone. It will also be understood that the mobile equipment 1 could distribute the initially captured image and/or the augmented reality model, to a plurality of other second equipments 4, either sequentially or simultaneously. The first user takes an initial image of an element (in this case the advertising poster 2) using the mobile equipment; the initial image is annotated in the manner described and illustrated in FIG. 1, to provide an annotated view 20. The first user will be referred as the originating user, the recipient of an image previously captured or a model will be called the second user. In the example, the originating user sends the captured image (preferably without the annotations) from the mobile equipment 1 to a second equipment i.e. a personal computer or laptop 4, of a second user, using for example e-mails, MMS, a blog, or an augmented reality social network such as Facebook, LinkedIn, Twitter, Google+, etc. An augmented reality social network is a network of augmented reality users sharing augmented reality models or captured images. As it will be seen, this augmented reality network could be represented by an augmented reality social network graph.

In one embodiment, the originating equipment captures the initial image and shares the initial image as captured, without any annotations. The not yet annotated transmitted image 22 is received by the second user and then displayed on the second user's equipment (i.e. laptop 4). Sharing the transmission of already annotated images could also be considered.

The second user can then capture an image of the image displayed on the laptop 4, using for example a second mobile equipment 1' with a camera such as a mobile phone, a PDA, a tablet, a smartphone, etc. Alternatively, the laptop 4 may transmit the transmitted image 22 to the second mobile equipment 1' e.g. over the internet. The image captured using the second mobile equipment 1', or sent to the second mobile equipment 1' from the laptop 4, can then be annotated by a suitable application on the mobile equipment 1' of the receiving user, e.g. in a similar way to that described and illustrated in FIG. 1.

In another embodiment, the laptop 4 of the receiving user can directly annotate the transmitted image 22 it receives. The annotation of the image is carried out by a suitable application in the laptop 4; in this case annotation is achieved without requiring a second mobile equipment 1' to capture an image. The laptop 4 may capture or form a second image which is to be annotated from the transmitted image 22 it receives; in this case the second image is identical to the transmitted image 22 except that the second image is in a form which is suitable to be annotated by a suitable program on the laptop 4. The second user can also forward or otherwise share the unannotated image, from the laptop 4, with at least one further friend.

If the second user uses the second mobile equipment 1' to annotate the image captured by the second mobile equipment 1', then the second mobile equipment 1' sends a second request R2 including second data information, from the second mobile equipment 1' to the server 3, in the same way that the first user sent the request R1 previously (as discussed with reference to FIG. 1). The second request R2 contains the location of the second mobile equipment 1' and/or time at which the second mobile equipment captured an image of the image displayed on the laptop 4. In a distributed system, this second request R2 might also be sent to any device in which the augmented reality model is available, including the second mobile equipment 1'.

The remote server 3, or a suitable application in the second mobile equipment 1', or in the laptop 4, prepares from the information received in request R2 an annotated image A2 to be displayed by the second mobile equipment 1', or provides information needed by this second mobile equipment 1' to prepare an annotated image.

In both scenarios, the remote server 3 verifies the information about location of the mobile equipments 1,1' and/or time received in request R1 and R2, and uses this information to determine whether the received images R1 and R2 respectively is an original image sent by the originating user, or a copy received from another user. For example, the remote server 3 could contain or have access to a database indicating the location from which each reference model 32 has been captured; so for example, if an image to be annotated by a first mobile equipment includes the Eiffel Tower as a feature, and the location of the first mobile equipment is Switzerland, then the remote server 3 can conclude that the image is not an original image i.e. the image has been sent to the first mobile equipment from another equipment. If on the other hand the location of the first mobile equipment is Champ de Mars in Paris, France, then the remote server 3 can determine that the image is an original image.

As it has been already mentioned, the sharing of augmented reality models for matching with subsequently captured images could also be considered. In this case, an originating user of a mobile equipment 1 creates, retrieves or edits an augmented reality model, and shares it with other users, for example by transmitting this model directly to another user or by making this model stored in a database 32 in the server 3 available to other users.

In one embodiment, at least some augmented reality models in the database 32 are associated with a location. This location could be indicated as coordinates of a geographical point. In another embodiment, at least some locations correspond to a larger surface, for example a region indicated by a center and radius, or a cell or group of cells in a territory logically divided into cells, etc. The location could also correspond to a 3D volume. Any image of a particular feature taken from a location not associated with this feature will then be supposed to be a transmitted copy, and not an original from the originating user.

Some augmented reality models could also be associated with particular time periods. For example, advertising posters are usually only displayed during limited time periods, and any image of a feature from this poster transmitted after this period is supposed to be a copy. Other features might be associated with time of the day (such as a day or a night view), periods of the year (such as a snowy mountain), or other periods or sets of periods where it is possible or not possible to capture them. A feature transmitted outside of a possible period (for example an image of snowy mountains in summer, or an image of an advertising poster during a period where the advertising campaign for the particular advertised product is no longer running) will then be supposed to be a copy.

Other information received by the server 3 could be used to distinguish between an initial image and a view from a copy. For example, the server 3 could analyse the quality of the image, its colour, the size of pixels, possible deformations (maybe caused by reproduction on a monitor), the luminosity, and so on, to determine that the image is not an original but more likely a copy such as a screen copy. Furthermore, as it will be described, the server could analyse watermarks or any hidden mark added between the original display of the image and a later display of the image by a different equipment, in order to distinguish an original image from a copy.

Figure 3:
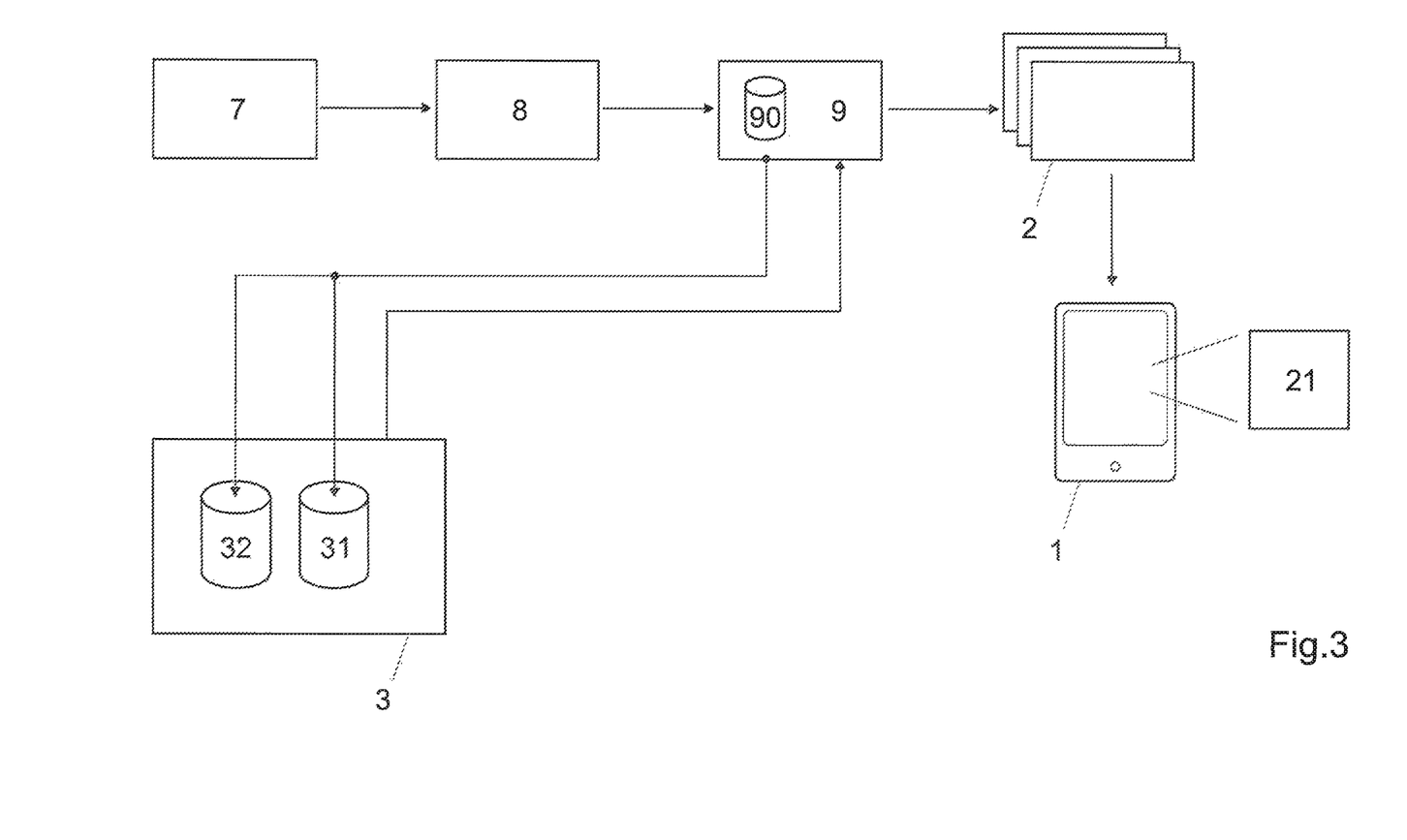
FIG. 3 schematically point ups a system for preparing and distributing value-added content for augmented reality application, in the exemplary case of an advertising application.

FIG. 3 schematically illustrates a system for preparing and distributing value-added content for augmented reality use cases, in the case of an advertising application. Elements which are identical or have a similar function to corresponding elements are shown in FIG. 1, they have the same reference numbers. The system illustrated on FIG. 3 comprises a product or a service provider 7 who wants to promote a product or a service; for example it is a marketing agency responsible for preparing a marketing campaign using a poster advertising company 9 for preparing a poster campaign resulting in the display of advertising posters 2 at some predefined locations and during a predefined time of period. The locations and time periods associated with each poster is stored in a database 90 administrated and/or operated by the poster advertising company 9. For example, the database 90 could store a data record indicating an exact location, or a 2D area such as a cell, or a 3D volume, from which each particular feature could be seen and captured, as well as a time period, or a set of time periods, or repetitive time periods, during which a particular feature can be seen. In the example of poster advertising, the database 90 can for example indicate the location of each individual poster 2, and the schedule of the time period of which each individual poster 2 will be presented at a location. In one embodiment, one or a plurality of locations is associated with one feature, for example when one poster is simultaneously displayed at a plurality of locations on a plurality of digital signages. In one embodiment, the location of a poster is not geographically fixed but is associated with the trajectory of a vehicle like a bus, a train, etc.

Annotations and other added-value content for annotating the images are stored by the poster advertising company 9 and/or by the marketing agency 8 in an annotation database 31 accessible by the server 3. Regular users of mobile equipments 1, 1' can also add annotations to the database 31.

Augmented reality models are stored by the poster advertising company 9 and/or by the marketing agency 8 and/or by other users in a database 32. These reference features are matched by the server 3 with later captured images in order to annotate those images.

Figure 4:
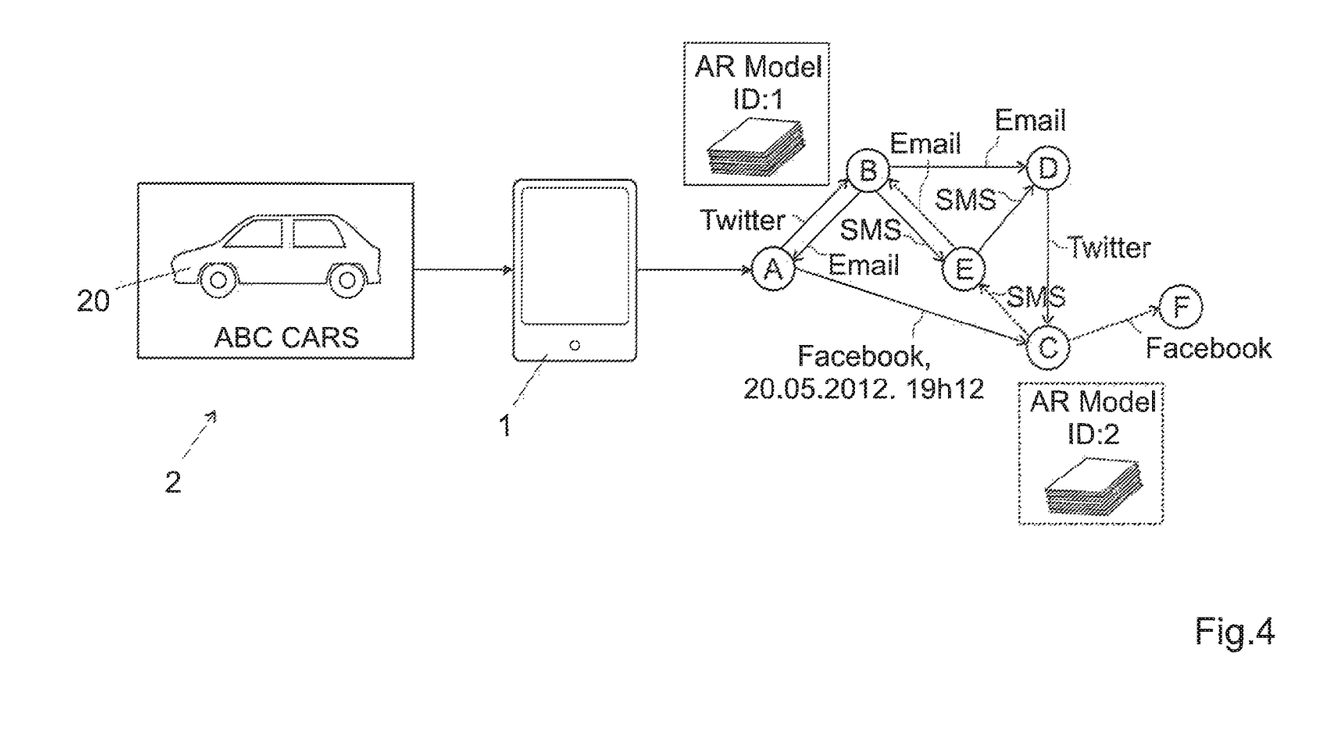
FIG. 4 schematically illustrates an augmented reality social network graph showing the viral distribution of an image or augmented reality model associated with augmented reality content.

FIG. 4 shows an example of an augmented reality social network graph illustrating a possible viral distribution of an image associated with annotations. The illustrated graph comprises nodes A to F corresponding to augmented reality users, and arcs between those nodes corresponding to various possible channels used to share an augmented reality model or an image to annotate between users. The node A is a root, i.e., a node of the network which first generates a new augmented reality model either by creating it or modifying it.

This graph may be described by and reconstructed with the following information:
  Augmented reality model ID
    Identification of the shared model.
  Augmented reality image ID
    Identification of the shared image to annotate.
  Sender ID
    Device unique identification of the augmented reality user sending a model or an image to annotate.
  Recipient ID
    Device unique identification of the augmented reality user receiving a model or an image to annotate.
  Time stamp
    Date and time at which the augmented reality model or image to annotate is sent.
  Location
    User location, ad determined with a GPS; cellular localization system etc, at the moment of sharing or receiving an augmented reality model or an image to annotate.
  Sharing channel
    Channel used to share the augmented reality model or image to annotate between two users. Example of channels could include e-mail, SMS, MMS, Facebook, Twitter, blogs, etc.
  Comments or feedbacks
    Users comments or feedbacks attached to a shared model or to an image to annotate.

An initial image 2 having features 20 associated with annotations is captured by a mobile equipment 1 of the user at the root A of the network, and then virally distributed to other users over various channels, such as e-mails, blogs, social networks such as Facebook, Twitter, etc. This image may be an original image, or a copy from another source. Each user can further distribute the image to other users, who can annotate the received image with their mobile equipment. Since the central server 3 (FIGS. 1-3) is informed on each time a request R1, R2 for annotations is received, it can follow the distribution of the image between users, and for example calculate how many users see and annotate each image initially captured by the originating user 1. This information can be used for example for invoicing this annotation to the advertising company 7 or the marketing agency 8, or for controlling the distribution of the image. A report can be prepared by the reporting module 34 and displayed in order to show how an image (either an original or already a copy) associated with augmented reality annotations is virally widespread, making use of a multiplication effect.

In one embodiment, the image is transmitted from one equipment to the next using a variety of channels and various type of messages, such as MMS, e-mails, contributions to blogs or social networks, etc. In this case, an application executed in the user's mobile equipment may be configured to inform the central server 3 about the channel used for further distribution of the image (e.g. whether the image was forwarded using and SMS, MMS or e-mail etc.); this will enable an even more detailed report to be prepared, showing the channel/application used by each user for sending image, as well as the transmission time and date.

In one embodiment, the application used for transmitting the image from one equipment to the next one also modifies the image, for example by adding or modifying a code such as a barcode, a data matrix or a watermark. This additional information could be used as a further indication that the transmitted image is not an original one from the view, but was transmitted by another user. It can also be used for tracking the distribution of image from one user to the next, and contain additional information about the viral distribution which can be transmitted and used by the central server 3. Furthermore, the annotation and augmented reality content might depend on this additional information or watermark, so that different users will receive different annotations depending on the watermark or other code associated with their image.

Certain features may have a token associated with them; for example a poster may have a token associated with it. Each time a user forwards an image which illustrates the poster, the user will be awarded with a token. The token may be part of the token scheme, whereby the user is awarded when they have collected a predetermined number of tokens. This feature is particularly advantageous for adverting as it enables advertising to reach otherwise unreachable markets; for example if a poster advertising campaign for a particular product is limited to the USA, each poster having a token associated with it; then a user located in New York may capture an image of one of the posters and send the image to any many other users as possible. The user is motivated to distribute the image to as many users as possible as each time the user sends the image they gain a token. The user may send the image to users which are located outside the USA thus reaching markets which the poster advertising campaign would otherwise not reach. The users who received the image may in turn forward the image they received to other users, and doing this they are also awarded with a token. Once the users have gained a predetermined number of tokens they may cash-in the tokens to receive an award e.g. a new application for their mobile equipment. The reward can be based on the level of the user in the sharing network; a user at the root, or close to the root, may for instance receive a greater reward than another user deeper in the hierarchy or less close to the root.

Additionally or alternatively, each feature may have a code such as a verification token associated with them, which is used by said server to verify whether an annotation of that feature can be displayed or not. For example, if the feature is a painting in an art gallery which has a token associated with it, the token allows the server to provide annotations for an original image of the painting, but prevents the server from providing annotations for images of the paintings which are not original images i.e. images received from another user. This will ensure that only those who have paid an entry to the gallery will be entitled to an annotated image of the painting. Token may be distributed for example as part of a fidelity program, or to friends or fans of a particular page or user of a social network. In this way, a user can dynamically distribute tokens to his friends in a social network, and use this token to control and limit the access to annotating content. In another embodiment, a token, or user rights, can be sold and bought in order to make the access of annotations (additional content) subject to a fee. The code or verification is thus available to a closed group of users. The code or token can also be transmitted by the first user to the second user and to subsequent users.

As it is already mentioned, users might share augmented reality models, instead or in addition to the sharing of images to annotate. In this case, a graph similar to the one illustrated on FIG. 4 might be used for tracking the propagation of an augmented reality model between the users. This might give information on how successful a marketing campaign is. By having a closer look at the different paths of the graph, we can precisely determine the history of the AR model throughout the network and extract useful insights such as whether the model has been modified or from where and using which channels people were sharing it.

The time associated with a branch of the graph, might be for example the time (and date) at which the Model was shared. Alternatively, the graph might indicate the time (and date) at which the shared model is actually used by the recipient.

The obtained graph information is particularly relevant to augmented reality content providers regarding different market such as Media, Advertisement or Technical Documentation. This information can indeed be used to choose the augmented reality content to be sent for a certain user. The provided augmented reality content might be tailored differently for distinct users. This selection can for instance be based on the augmented reality model history in the graph: for example, users looking at an advertisement may get more and more discounts the more they share an augmented reality model which is in turn further shared. It becomes a powerful and controllable marketing tool to create viral advertisement. Similar examples may use location, time, sharing channel or other available information to create the viral marketing.

Another application concerns community sharing. For instance, tourists visiting a new city might use augmented reality as an interactive guide. While capturing images of historical buildings with their mobile equipments, the visitors obtain additional information as augmented reality annotations superimposed on the image. Visitors wanting to share information about particular parts of the building could add it directly in the augmented reality model of the building. In this way, when subsequent visitors capture an image of the same building, they would be able to access this additional content as annotations superimposed on the image.

For all embodiments (sharing of images to annotate, or sharing of augmented reality models), two architectures designs might be considered: centralized or distributed. In a centralized system, the augmented reality model database 32 and the annotation database 31 are centrally stored in a central server 3 and common to all users of the system. It therefore ensures a complete database representation for all users. A distributed system on the other hand stores augmented reality models and annotations in the user's equipments 1, 1'; a centralized server might be available or not.

Figure 5:
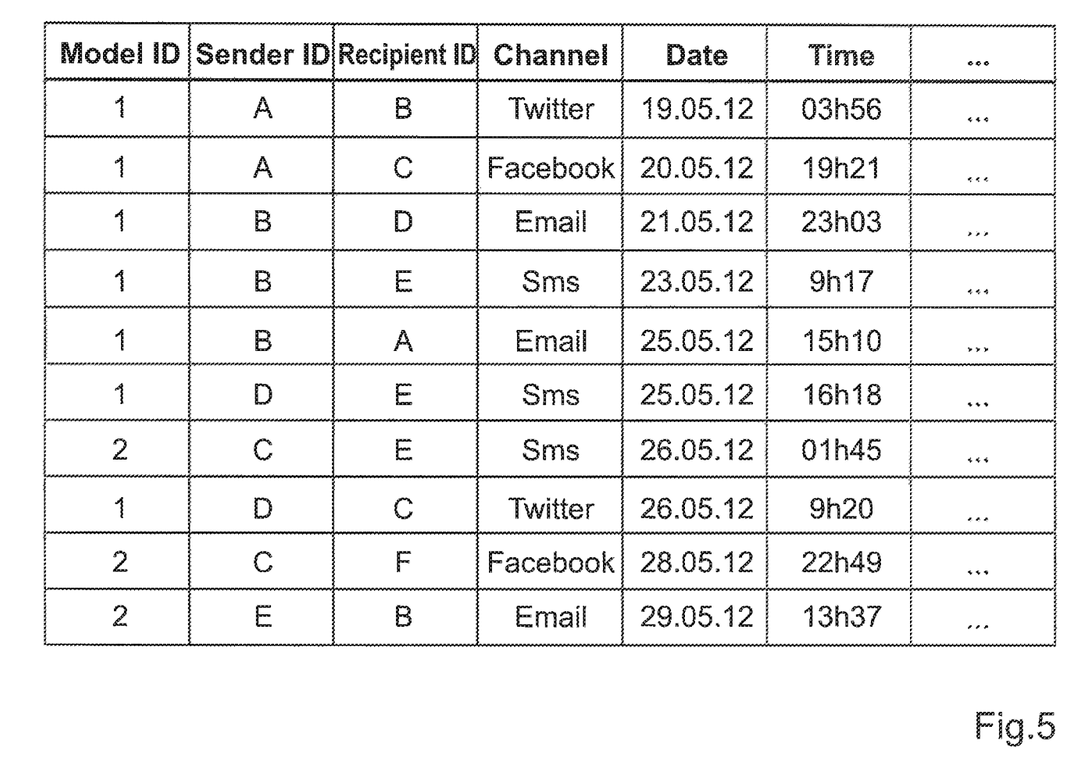
FIG. 5 shows a table illustrating the information stored in a centralized database.

FIG. 5 is an example of table corresponding to the graph of FIG. 4 and showing how a description of the graph might be stored in a centralized database, and updated for example every time an augmented reality model or an image to annotate is shared or displayed. From the database information, it is possible to reconstruct the corresponding complete network graph.

In this case, in a centralized architecture, each time a model is shared with a recipient, a notification to download the model data from the centralized server 3 might be sent to this recipient. This way, we avoid sending the model each time the model is shared.

Figure 6:
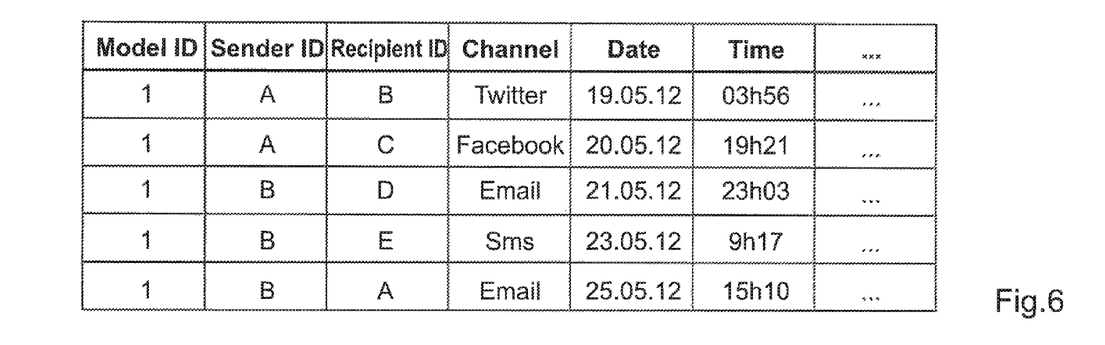
FIG. 6-8 show various tables illustrating the local information that might be stored in different user devices in a distributed system.
Figure 7:
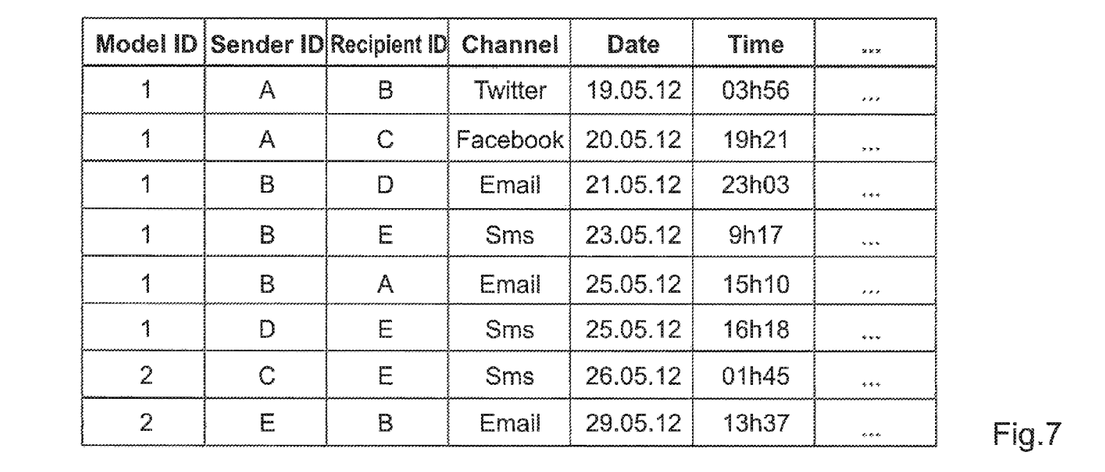
Figure 8:
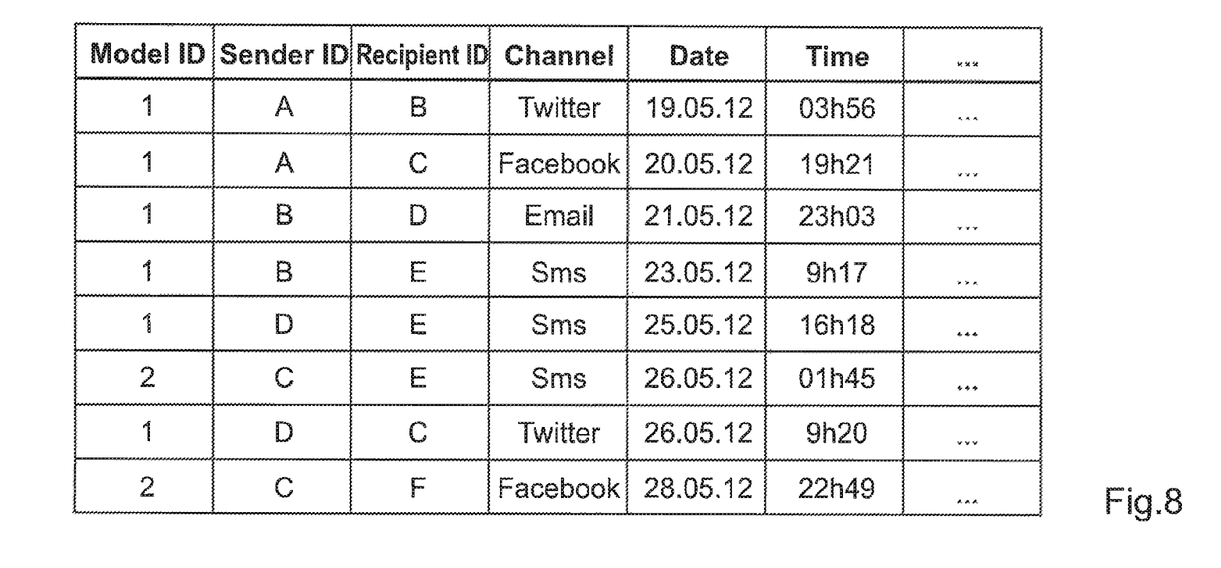

FIGS. 6-8 shows examples of tables corresponding to the graph of FIG. 4 and showing how a description of the graph might be stored in a distributed system. In a distributed system, the database containing the graph information is stored on the user's equipments, without the need of a centralized server. A typical distributed architecture might be based on a peer-to-peer network, in which each node acts as a client or a server for the other nodes in order to transfer data. It implies that each time an augmented reality model or image is shared between two users, a direct connection is established between them for the augmented reality model to be transferred. A version of the database is stored on different user's equipments and updated every time a connection is set up with that user. The updated database of the two connected users is composed of the union of the entries stored in their local database.

A distributed system ensures that each user is aware of the history of the relevant augmented reality models or images he received. FIGS. 6, 7 and 8, respectively, depict the local information stored for user A, B and F, respectively, in the network of FIG. 4. From the distributed databases, it is possible for a user to determine the history of each received augmented reality model.

A user who receives a model can choose to further forward it to other users or edit it. The augmented reality model edition can imply changing the annotations or modifying the reference image. It leads to the attribution of a new augmented reality model ID.

In a similar way, a user who receives an image to annotate can choose to further forward it to other users or edit it. The augmented reality image edition can imply modifying the reference image. It leads to the attribution of a new augmented reality image ID.

Figure 9:
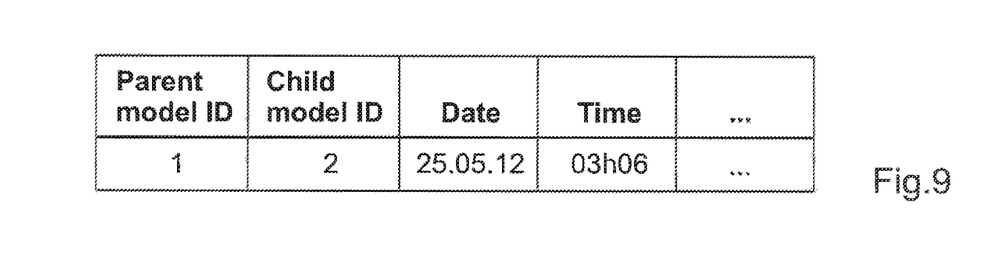
FIG. 9 shows a table illustrating the parent/child relation between two augmented reality models.

The modification of a model, respectively image, is similar to the creation of a new augmented reality model, respectively image. The main difference resides in the fact that the original augmented reality model ID, respectively augmented reality image ID (i.e. before edition), is saved. It then becomes possible to reconstruct the parent/child relation between augmented reality models/images. This relation is stored in another table of the database (either centralized or distributed), as represented in FIG. 9, which contains a parent model ID and its child model ID. Except from that new entry, all other information generated upon edition of an augmented reality model, respectively image, is the same as if the model/image were newly created.

A mechanism can also be implemented in the system to notify users about an updated model. Users can then update their model and see the modifications. It opens doors to community sharing and feedback loops between users. It means that a group of users can keep sharing and editing a same augmented reality model while being able to keep track of updated and old versions. Options to notify or filter out some users only may be available for confidentiality or privacy purposes. In this way, the idea of source control systems, which is known in other fields, is applied to augmented reality models.

The various operations of methods described above may be performed by any suitable means capable of performing the operations, such as various hardware and/or software component(s), circuits, and/or module(s). Generally, any operations described in the application may be performed by corresponding functional means capable of performing the operations. The various means, logical blocks, and modules may include various hardware and/or software component(s) and/or module(s), including, but not limited to a circuit, an application specific integrated circuit (ASIC), or a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration. A server may be implemented as a single machine, as a set of machine, as a virtual server, or as a cloud server.

As used herein, the term "annotation" encompasses a wide variety of possible elements, including for example text, still images, video images, logos, image layers, sounds and/or other elements that could be superimposed or otherwise added to an image.

As used herein, the term "determining" encompasses a wide variety of actions. For example, "determining" may include calculating, computing, processing, deriving, investigating, looking up (e.g., looking up in a table, a database or another data structure), ascertaining, estimating and the like. Also, "determining" may include receiving (e.g., receiving information), accessing (e.g., accessing data in a memory) and the like. Also, "determining" may include resolving, selecting, choosing, establishing and the like.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A software module may consist of an executable program, a portion or routine or library used in a complete program, a plurality of interconnected programs, an "apps" executed by many smartphones, tablets or computers, a widget, a Flash application, a portion of HTML code, etc. A storage medium may be coupled to a processor such that the processor can read information from, and write information to, the storage medium. In the alternative, the storage medium may be integral to the processor. A database may be implemented as any structured collection of data, including a SQL database, a set of XML documents, a semantic database, or a set of information available over an IP network, or any other suitable structure.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method comprising:
   (a) an originating user captures an original image with a first mobile equipment;
   (c) first data information including the time and the location of said first mobile equipment is stored, and said first data information being sent to a server;
   (d) the originating user shares said image, or an augmented reality model corresponding to said image, with the user of a second equipment;
   (e) an annotated image is displayed on said second equipment;
   (g) second data information including the time and the location of said second equipment when the second equipment received said image or augmented reality model from said originating user or when the second equipment displays the said image or augmented reality model from said originating user, is sent to said server;
   (h) said server determines from said location and/or time whether said image is an original image captured by the originating user, or a transmitted image displayed to a second user, by:
   identifying content in the image;
   retrieving from a database a predefined location condition which is associated with content corresponding to said identified content and/or retrieving from a database a predefined time condition which is associated with content corresponding said identified content; and
   determining if the location which was sent to the server meets said retrieved predefined location condition and/or determining if the time which was sent to the server meets said retrieved predefined time condition;
   determining that the image is an original image if the location condition and/or time condition is met; and determining that image is a transmitted image if the location condition and/or time condition is not met.

2. The method of claim 1, wherein:
   (b) the original image is displayed on the originating user's mobile equipment with first annotations superimposed on the image and in relation with recognized features of the image;
   (c) said first data information further include an information that said first annotations has been displayed, said first data information being sent to a server where it is stored;
   (d) the originating user shares said image as an image to annotate by transmitting said image to said second equipment;
   (e) said transmitted image is displayed on said second equipment;

(f) second annotations are displayed to said second user in combination with said transmitted image;

(g) said second data information further includes an information that said second annotations has been displayed, said second information being further sent to the server.

3. The method of claim 2, wherein said second user captures said image displayed on a second equipment with a second mobile equipment comprising a camera, and wherein said display of second annotations initiated by said second user is carried out by said second mobile equipment.

4. The method of claim 1, wherein the first annotations which are associated with the original, initially captured image are different from the second annotations which are associated with any subsequent transmitted image.

5. The method of claim 1, wherein the originating user shares an augmented reality model corresponding to said image, with the user of a second equipment, and wherein:

(b) said first data information include said time and/or location of said first mobile equipment when said image used as a model is shared by the originating user;

(f) second annotations are displayed to said second user, based on said model and superimposed on a further image;

(f) the second user shares said model with a third user;

(g) said second data information include said time and/or location of said second mobile equipment when said image used as a model is shared by the second user.

6. The method of claim 1, wherein said first and second data information is stored in a central server and made accessible to said first mobile equipment and to said second equipment.

7. The method of claim 1, wherein said first and second data information is stored in a distributed way in said user's equipments.

8. The method of claim 1, wherein said annotations depend on said location in said data information, so that different annotations are superimposed onto a same image if said location is different.

9. The method of claim 1, wherein said annotations depend on said time in said data information, so that different annotation are superimposed onto a same image if said time is different.

10. The method of claim 1, further comprising:

a code which is associated with said image;

said annotations are only displayed if said code is available to said first respectively second user.

11. The method of claim 10, wherein said code is only made available to a closed group of users.

12. The method claim 10, wherein said code is transmitted by said first user to said second user.

13. The method of claim 10, wherein said code is transmitted by a user over a social network.

14. The method of claim 10, wherein said code is made available to all fans of a particular page of a social network.

15. The method of claim 1, further comprising:

embedding a watermark in said image;

including in said data information sent to said server information depending on said watermark.

16. The method of claim 15, further comprising:

modifying said watermark for transmission of said image to a different user.

17. The method of claim 16, wherein said server determines from said information depending on said watermark whether said image is an original image captured by the originating user, or a transmitted image displayed to a second user.

18. The method of claim 1, wherein said image is an image of an advertising, wherein said server compares said time and/or location with known time and/or location of presentation of said advertising to determine whether said annotations have been associated with an original image captured by the originating user, or with a transmitted image displayed to a second user.

19. The method of claim 1, further comprising associating each said image with a geographic area, and determining that said image is a transmitted image if said location of said second equipment is outside of said geographic area.

20. The method of claim 5, further comprising a step where a user edits a received augmented reality model, resulting into a new augmented reality model, and storing the relationship between the received augmented reality model and the edited augmented reality model.

21. A method carried out by a server and comprising:

(i) receiving in said server first data information including the time and/or the location of a mobile equipment together with an information that first annotations have been displayed or that an augmented reality model has been shared;

(ii) receiving in said server second data information including the time and/or the location of a second equipment together with an information that second annotations have been displayed by said second equipment or that the augmented reality model has been made available to said second equipment;

(iii) determining from said location and/or time whether said annotations have been associated with an original image captured by the originating user, or with a transmitted image displayed to a second user, by:

identifying content in the image;

retrieving from a database a predefined location condition which is associated with content corresponding to said identified content and/or retrieving from a database a predefined time condition which is associated with content corresponding said identified content; and determining if the location which was sent to the server meets said retrieved predefined location condition and/or determining if the time which was sent to the server meets said retrieved predefined time condition;

determining that the image is an original image if the location condition and/or time condition is met; and determining that image is a transmitted image if the location condition and/or time condition is not met.

22. The method of claim 21, wherein said image is an image of an advertising, wherein said server compares said time and/or location with known time and/or location of presentation of said advertising to determine whether said annotations have been associated with an original image captured by the originating user, or with a transmitted image displayed to a second user.

23. The method of claim 21, wherein said server determines from a watermark embedded in said image whether said image is an original image captured by the originating user, or a transmitted image displayed to a second user.

24. The method of claim 21, wherein said server verifies a token and determine from said token whether said annotations can be displayed or not.

25. A computer program product, stored on a non-transitory media support and comprising instructions causing at least one data processor to execute the steps of the method according to claim 1.

26. A system, comprising:
- a first mobile equipment comprising a camera suitable for capturing an original image, and a display for displaying said image;
- an augmented reality module for retrieving and superimposing annotations on top of said image;
- a second equipment comprising a display;
- a software module arranged for sharing with said second equipment said original image, or for sharing with said second equipment an augmented reality model corresponding to said original image;
- a store storing first data information including the time and/or the location of said first mobile equipment and the time and/or location of said second mobile equipment when said image is displayed or when said image or said model is shared;
- a means for determining from said location and/or time whether said image is an original image captured by the originating user, or a transmitted image displayed to a second user, by:
- identifying content in the image;
- retrieving from a database a predefined location condition which is associated with content corresponding to said identified content and/or retrieving from a database a predefined time condition which is associated with content corresponding said identified content; and
- determining if the location which was sent to the server meets said retrieved predefined location condition and/or determining if the time which was sent to the server meets said retrieved predefined time condition;
- determining that the image is an original image if the location condition and/or time condition is met; and determining that image is a transmitted image if the location condition and/or time condition is not met.

27. A server comprising a database storing data corresponding to an augmented reality social network graph, said graph comprising a plurality of nodes corresponding to a plurality of equipments, and a plurality of branches between said nodes corresponding to the transmission of an image or augmented reality model from one node to another node, said branches being associated with a time corresponding to the time of transmission or display of said image or model, said branches being further associated with a location corresponding to the location of an equipment when said image or model is transmitted.

28. A method comprising:
- (a) an originating user captures an original image with a first mobile equipment;
- (c) first data information including the time and/or the location of said first mobile equipment is stored, and said first data information being sent to a server;
- (d) the originating user shares said image, or an augmented reality model corresponding to said image, with the user of a second equipment;
- (e) an annotated image is displayed on said second equipment;
- (g) second data information including the time and/or the location of said second equipment when the second equipment received said image or augmented reality model from said originating user or when the second equipment displays the said image or augmented reality model from said originating user, is sent to said server;
- (h) said server determines from said location and/or time, and based on data relating to the content of image, whether said image is an original image captured by the originating user, or a transmitted image displayed to a second user, wherein said data relating to the content of image includes at least one of temporal and geographical data associated with content of the image, by: identifying content in the image;
- retrieving from a database a predefined location condition which is associated with content corresponding to said identified content and/or retrieving from a database a predefined time condition which is associated with content corresponding said identified content; and determining if the location which was sent to the server meets said retrieved predefined location condition and/or determining if the time which was sent to the server meets said retrieved predefined time condition; determining that the image is an original image if the location condition and/or time condition is met; and determining that image is a transmitted image if the location condition and/or time condition is not met.

* * * * *